July 22, 1958  H. J. SCHULTZ  2,844,813
BATTERY TESTER
Original Filed Dec. 27, 1954

INVENTOR
HENRY J. SCHULTZ
BY Brooks Walker
ATTORNEY.

United States Patent Office 2,844,813
Patented July 22, 1958

2,844,813

BATTERY TESTER

Henry J. Schultz, Hayward, Calif., assignor to
Brooks Walker, San Francisco, Calif.

Original application December 27, 1954, Serial No. 447,815. Divided and this application October 26, 1956, Serial No. 619,658

3 Claims. (Cl. 340—249)

This invention pertains to battery testers for indicating particularly when the level of the liquid is down to a dangerous point and needs refilling.

This application is a division of application Ser. No. 477,815, filed December 27, 1954, now Patent No. 2,792,567.

Other devices have been shown for indicating when the liquid level of the battery is low, but this invention pertains to improvements in such constructions, wherein a probe is inserted in a battery through a filler plug or through the cover of the battery and picks off a small amount of current between the probe and the grounded or other terminals of the battery to operate an indicator light when the circuit is closed, through medium of battery fluid.

Another object of the invention is to utilize an existing switch on the car, such as the stoplight switch, and have an indicator light on the dash board which indicates when the stoplight switch is on provided the liquid level in the battery is at a safe level, but if the liquid level in the battery is low the indicator light will not go on—indicating that either the liquid is low or that the indicator light is burned out or the circuit is open. In this last construction, the polarity on the probe is reversed as the current from the probe will flow in the opposite direction through the stoplight after the stoplight switch has been opened to discharge any gas that has been formed on the probe. When the brake is pressed the hydraulic pressure closes the stoplight switch and the indicator light will light on the dash board if the battery level is satisfactory and if the stoplight is functioning. If the stoplight bulb is not functioning the indicator light will show no afterglow when the foot brake has been released, the afterglow will be present when the stoplight is burning. Thus, the presence or lack of presence of the afterglow in the indicator light will show whether the stoplight bulb is operating and the lighting of the indicator light when the battery is full will show that the stoplight switch is functioning correctly. If the indicator light does not function, it would indicate that the battery level is low, or that the circuit is open and needs attention.

Other objects of the invention will be more particularly pointed out in the accompanying specifications and claims.

I have illustrated my invention in the accompanying drawings, in which.

In all figures like numerals of reference refer to corresponding parts.

Figure 1:
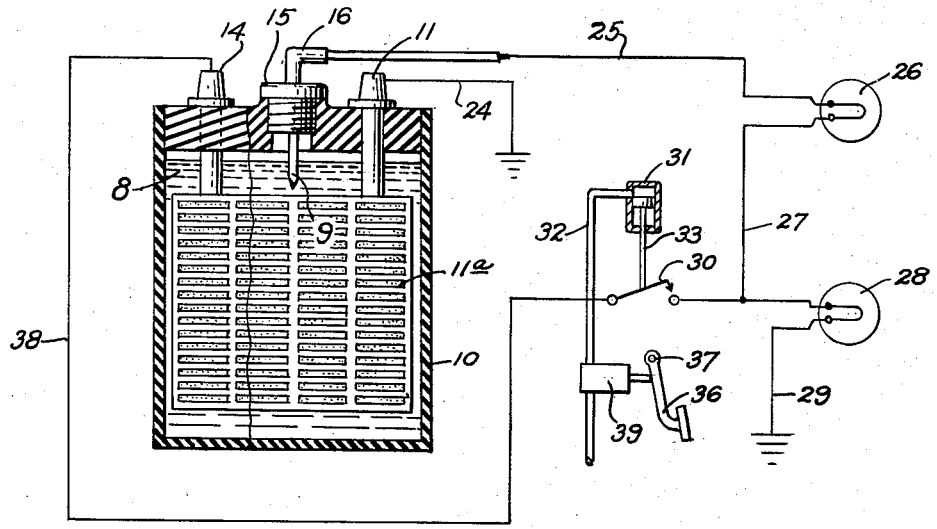
Fig. 1 is a cut away view of a battery taken at section 1—1 of Fig. 2, and a schematic wiring diagram illustrating another form of the invention.
Figure 2:
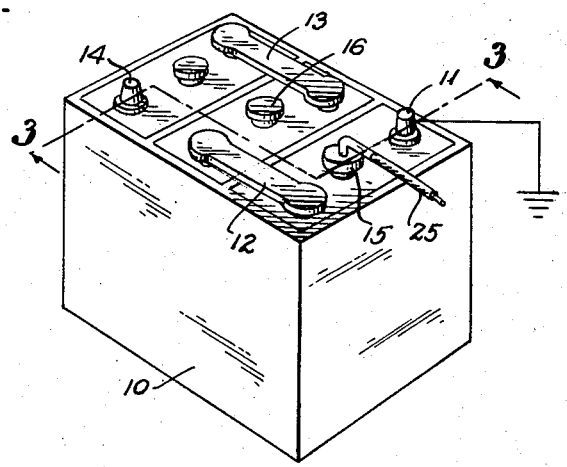
Fig. 2 is a perspective view of a battery with the connections as shown in Fig. 1 illustrated.

In Figs. 1 and 2 I have shown a battery 10 having a grounded terminal 11 connected to ground by wire 24. A connecting terminal 12 connects the ground cell to the center cell and connecting terminal 13 connects the center cell to the cell on the opposite end with terminal 14 being the hot or 6-volt terminal of a 3-cell battery. Top 15 supports probe 9 which pierces liquid 8 to a point just above the top of battery plates 11a. A detachable connection 16 is secured to the top of probe 9.

The brightness of the indicator light is an indication of the depth of liquid above the probe. The tapered end of the probe amplifies this effect. The probe may be made of a lead composition similar to the internal battery lead connections.

In the drawings I have shown a construction, in which the battery 10 has a probe 9 inserted in the same cell with the grounded terminal 11. This will pick up the voltage of two cells when the battery liquid is at a safe level. The current from probe 9 goes through indicator light 26 by means of wire 25 and through wire 27 to stoplight 28 which is grounded by wire 29. A stoplight switch 30 is actuated by the motion of brake pedal 36 about pivot 37 actuating master cylinder 39 to let the fluid pressure travel up line 32 to actuate cylinder 31 and piston rod 33 to close the stoplight switch 30 whenever the foot brake is on. A diaphragm-type contact switch may also be used of a more conventional nature. In operation when the stoplight switch is closed by the pressing of the pedal 36, current flows from hot terminal 14 through wire 38 to stoplight switch 30 to stoplight 28 through wire 29 to ground. Also, current will flow back through line 27, indicator light 26, wire 25, terminal 16 to probe 9 whenever the stoplgiht switch is closed provided probe 9 is immersed in the battery liquid. If the battery liquid is too low the indicator light 26 will not light. If stoplight switch 30 is faulty indicator light 26 will not light. If stoplight 28 is burned out, the charge built up on probe 9 while switch 30 is closed will not be slowly dissipated as an afterglow when the stoplight switch is operating, thereby indicating the stoplight circuit is open or stoplight bulb is burned out. When stoplight 28 is in good operating condition, the discharge through stoplight 28 when stoplight switch 30 is open will slowly discharge the formation on the outside of probe 9 which is built up when the stoplight switch 30 is held closed for any appreciable length of time, as in a usual vehicle stop.

By this design we have provided a construction whereby: (1) The existing stoplight switch is used without requiring an extra switch for the battery testing indicator bulb. (2) The battery testing indicator bulb serves the dual purpose of indicating when the stoplight is on by its afterglow. This afterglow function indicates whether or not the stoplight bulb is burned out. (3) The lighting of the indicator light signals when the stoplight switch is closed and also indicates whether or not the battery liquid needs replenishing.

Other features of the invention will be more particularly pointed out in the accompanying claims.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim as my invention:

1. In a vehicle, the combination including a battery of the wet-cell type having at least two poles one of which is grounded and the other ungrounded; a probe supported from above the battery liquid in a cell having said grounded pole and extending down into the liquid when said liquid is at its high normal level; a stoplight in said vehicle having one side grounded; a low-battery-liquid-level indicator light, having one side grounded; an electric circuit connecting said ungrounded pole to said stoplight and, in parallel with said stoplight, through said indicator light to said probe; and a switch in said circuit operable at will by an operator of said vehicle for closing said circuit, whereby said stoplight and said indicator lights are both lighted if said probe is in contact with said battery liquid, the failure of said indicator light to burn, indicating that either the indicator light is burned out, the switch is faulty, or the battery liquid level low.

2. In a vehicle, the combination including a battery of the wet-cell type having at least two poles one of which is grounded and the other ungrounded; a probe supported from above the battery liquid and extending down into the liquid when said liquid is at its high normal level; a stoplight in said vehicle; a low-battery-liquid-level indicator light; an electric circuit connecting said battery in series with said stoplight; and a parallel circuit connecting said battery in series with said indicator light and said probe; and a switch in both said circuits operable at will by an operator of said vehicle for closing said circuits whereby said stoplight and said indicator lights are both lighted if said probe is in contact with said battery liquid, the failure of said indicator light to burn, indicating that either the indicator light is burned out, the switch is faulty, or the battery liquid level low.

3. In a vehicle, the combination including a battery of the wet-cell type having at least two poles one of which is grounded and the other ungrounded; a probe supported from above the battery liquid in a cell having said grounded pole and extending down into the liquid when said liquid is at its high normal level; a stoplight in said vehicle having one side grounded; a low-battery-liquid-level indicator light, having one side grounded; an electric circuit connecting said ungrounded pole to said stoplight and, in parallel with said stoplight, through said indicator light to said probe; and a switch in said circuit operable at will by an operator of said vehicle for closing said circuit, whereby said stoplight and said indicator lights are both lighted if said probe is in contact with said battery liquid, the failure of said indicator light to burn, indicating that either the indicator light is burned out, the switch is faulty, or the battery liquid level low; and whereby if said stoplight is burned out there will be afterglow in said indicator light after closing said switch, there being no afterglow if the stoplight is working properly.

References Cited in the file of this patent

UNITED STATES PATENTS

| | | |
|---|---|---|
| 1,753,381 | Levings | Apr. 8, 1930 |
| 2,161,441 | Vickers | June 6, 1939 |